G. W. SCHILLING.
DEVICE FOR REMOVING GEAR WHEELS, &c.
APPLICATION FILED DEC. 27, 1919.
1,368,760.
Patented Feb. 15, 1921.
3 SHEETS—SHEET 2.
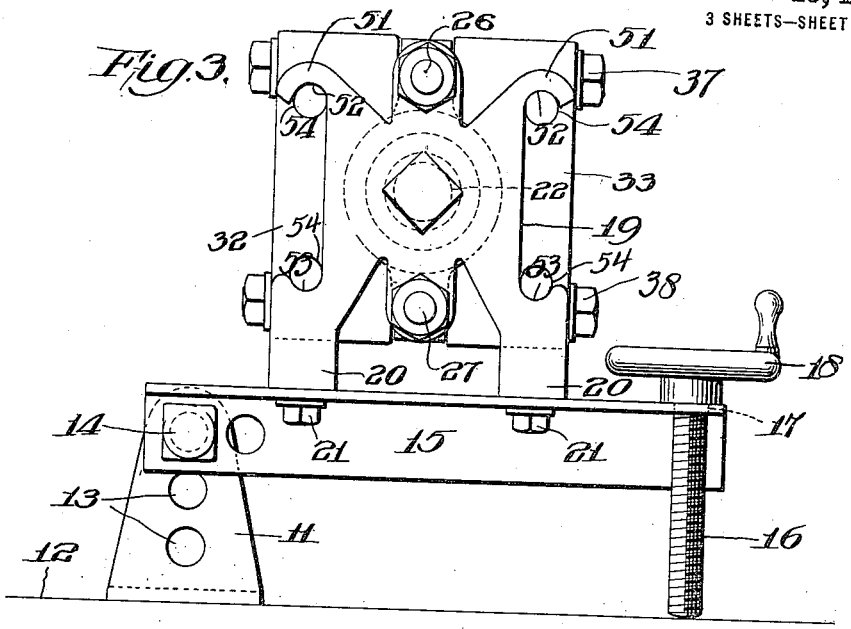
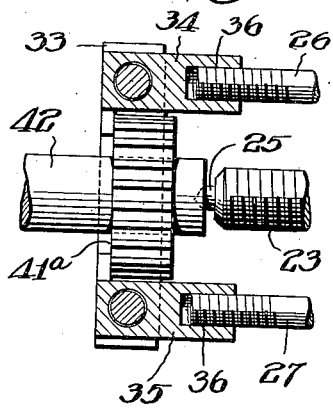
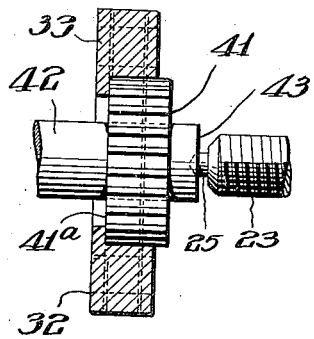
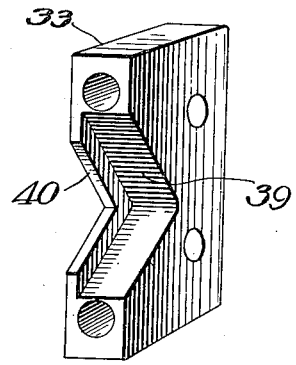
Witnesses:
Inventor
George W. Schilling,
By Joshua R. H. Potts
his Attorney

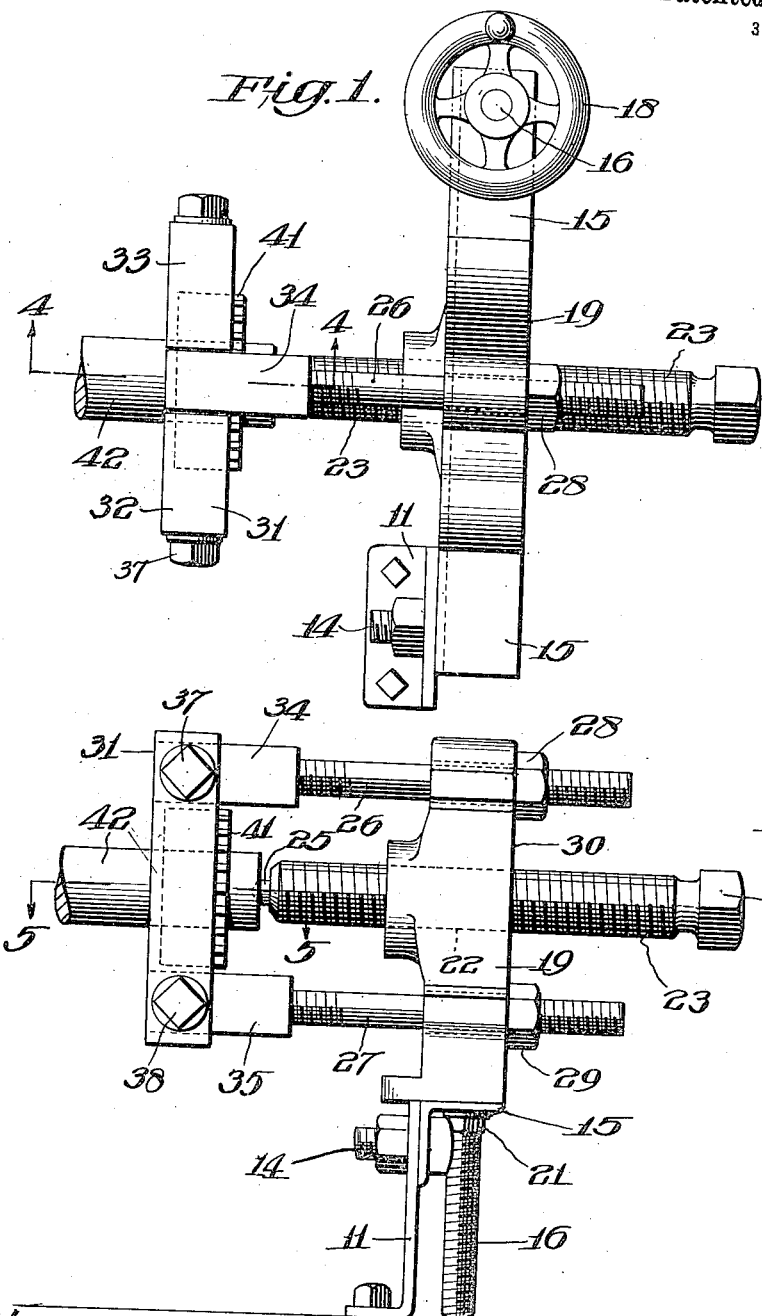

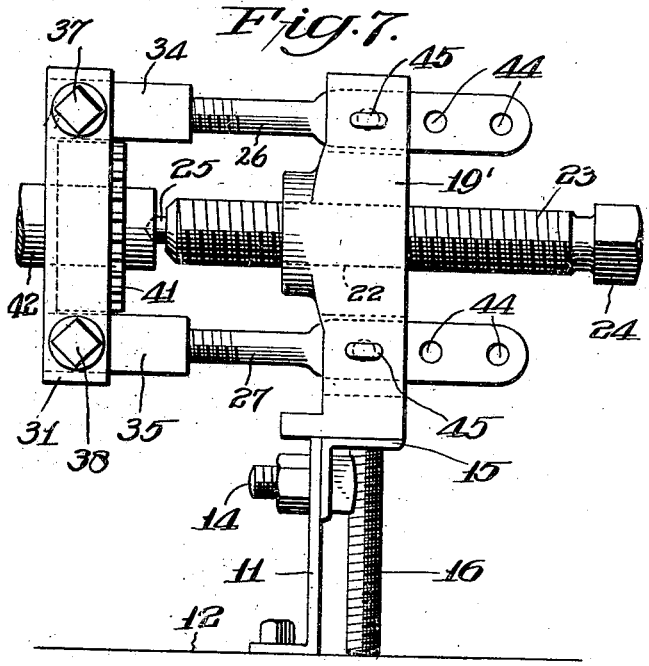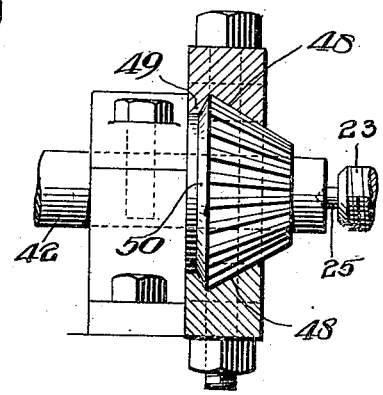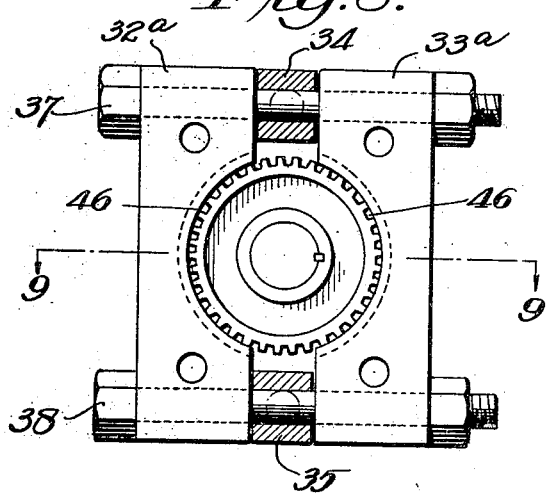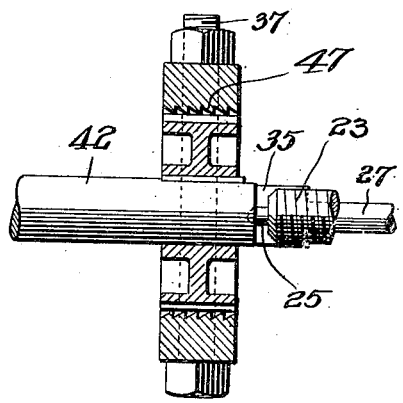

UNITED STATES PATENT OFFICE.

GEORGE W. SCHILLING, OF PHILADELPHIA, PENNSYLVANIA.

DEVICE FOR REMOVING GEAR-WHEELS, &c.

1,368,760.

Specification of Letters Patent.

Patented Feb. 15, 1921.

Application filed December 27, 1919. Serial No. 347,769.

*To all whom it may concern:*

Be it known that I, GEORGE W. SCHILLING, a citizen of the United States, residing at Roxboro, Philadelphia, in the county of Philadelphia and State of Pennsylvania, have invented certain new and useful Improvements in Devices for Removing Gear-Wheels, &c., of which the following is a specification.
One object of my invention is to provide an improved device which can be quickly and easily operated, for removing gear wheels, pulleys, couplings, etc., from shafts.

Another object is to so construct the device of my present invention that it will be particularly well adapted for use on bench work and to include means whereby the parts can be easily and quickly adjusted with respect to the top of the bench to suit various requirements.

A further object is to so construct the device of my invention that it will be operated to remove gears from shafts even though the gears are close up to a bearing and will be also suitable for removing bevel gears and pinions.

A still further object is to make my invention of a simple and durable construction and so that it can be easily and quickly made and manipulated.

These objects, and other advantageous ends which will be described hereinafter, I attain in the following manner, reference being had to the accompanying drawings in which—

Figure 1 is a top plan view illustrating my invention as it appears when operating to remove a gear wheel from a shaft, Fig. 2 is a front elevation of Fig. 1, Fig. 3 is an end view of Fig. 2, Fig. 4 is a fragmentary sectional elevational view taken on the line 4—4 of Fig. 1, Fig. 5 is a fragmentary sectional plan view taken on the line 5—5 of Fig. 2, Fig. 6 is a perspective view of one of the elements of my invention, Fig. 7 is a view of the same general character as Fig. 2 illustrating a modified form of certain of the parts of my invention, Fig. 8 is an end elevation showing a modified form of certain of the other parts of my invention, Fig. 9 is a sectional plan view taken on the line 9—9 of Fig. 8, and Fig. 10 is an elevation, partly in section, showing another modification of certain of the parts adapted for use to remove a bevel gear.

Referring particularly to Figs. 1 to 6 inclusive, 11 represents a standard which is adapted to be secured to the top 12 of a work bench and this standard has holes 13 therein, one positioned above the other as clearly shown in Fig. 3. A pivot bolt 14 is adapted to be projected through any of the holes 13 and through one end of a bracket 15 so that said bracket is pivotally connected to the standard 11.

An adjusting screw 16 extends through a tapped hole 17 in the opposite end of the bracket 15 and the lower end of the adjusting screw engages the bench top 12. A hand-wheel 18 is secured to the upper end of the adjusting screw so that by turning the hand-wheel, the bracket 15 can be raised and lowered on the bolt 14 as a pivot. A comparatively heavy metallic head 19 has feet 20 which are secured to the upper surface of the bracket 15 by bolts 21. This head 19 has a substantially central tapped hole 22 through which extends a screw threaded plunger 23. One end of the screw threaded plunger is made angular for engagement with a wrench and the other end of said plunger has a pointed centering portion 25 which is adapted to engage within the centering recess in the end of a shaft. Two bolts 26 and 27 extend freely through the head 19 at positions above and below the screw threaded plunger 23. Nuts 28 and 29 are respectively screwed on the threaded ends of the bolts 26 and 27 so as to engage the surface 30 of the head 19.

A puller block 31 is made in two sections 32 and 33. Spacing nuts 34 and 35 are positioned between the sections 32 and 33 in line with the respective bolts 26 and 27; said bolts having threaded portions for engagement within the tapped cavities 36 in the spacing nuts 34 and 35. Clamping bolts 37 and 38 extend through the sections 32 and 33 and through the respective spacing nuts 34 and 35. Each of the sections 32 and 33 has a substantially V-shape recess 39 and a flange 40 of the same general shape as the recess 39, as clearly shown in Fig. 6. These recesses 39 on each of the sections are oppositely disposed, as shown in Figs. 4 and 5 so that the recesses provide means whereby the sections 32 and 33 can embrace an article, such for example as the gear wheel 41 which is to be withdrawn from a shaft 42. The flanges 40 which project inwardly from the recesses position themselves against the surface 41ª of the gear wheel which is opposite the end 43 of the shaft, and the pointed portion 25 of the screw threaded plunger is adapted to engage within the recess in the end 43 of the shaft 42.

By the construction and arrangement of parts as above described, the nuts 28 and 29 can be turned so as to properly move the puller block 31 in the position so that the flanges 40 bear evenly upon the surface 41ª; it being noted that the spacing nuts 34 and 35 by being connected to the puller block by the bolts 37 and 38 permit of a slight pivotal movement so as to allow for any variation or irregularities of the gear wheel. The screw threaded plunger 23 can then be rotated so as to push the shaft though the gear, permitting the latter to remain between the puller block sections; or if desired the nuts 28 and 29 can be rotated to move the puller block 31 toward the head 19 and in so doing will pull the gear wheel 41 or other device from the shaft.

In the form of my invention shown in Fig. 7, the construction is substantially similar with exception that instead of using the nuts 28 and 29 on screw threaded portions of the bolts 26 and 27, said bolts 26 and 27 have a series of holes 44 and are connected to the head 19' by cotter pins 45; thus permitting the puller block 31 to be positioned at various distances from the head 19'.

In Figs. 8 and 9 I have shown a modification of the puller block in which the recesses 46 of the sections 32ª and 33ª are made arcuate and provided with serrations or teeth 47 which when the bolts 37 and 38 are tightened will bite into the teeth of the gear wheel, as shown in Fig. 9, and with this construction flanges such as the flanges 40 above described are not necessary.

In the form of puller block shown in Fig. 10, the recesses 48 are made of such shape as to embrace a bevel gear pinion and the flanges 49 are adapted to engage the surface 50 of the gear to permit its withdrawal from the shaft.

While I have described my invention specifically as adapted for removing gear wheels, it will be noted that it can be used for removing any articles which are jammed, keyed or otherwise secured to a shaft and in certain of the claims I have used the word "wheel" as a matter of convenience. However, this term is meant to imply a gear, pulley, coupling or other article which is mounted on a shaft.

I have also illustrated the head 19 provided with hooked ends 51 and recesses 52 and 53 so that if desired I can use the same as the head structure which forms a part of my Patent No. 1,268,285 of June 4, 1918 and for this reason I have also shown the sections of the puller block provided with holes 54 which register with the recesses 52 and 53, as clearly shown in Fig. 3 of the drawing.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come with in the scope of the appended claims.

Having thus described my invention, what I claim as new and desire to secure by Letters Patent is:—

1. A device of the character described including a head; a screw threaded plunger in screw threaded engagement with said head; a puller block made in sections, means for moving the sections toward each other; and means connecting said puller block with the head and spaced from said plunger, said connecting means being adjustable within their lengths whereby the puller block can be held at various distances from said head; substantially as described.

2. A device of the character described including a head; a screw threaded plunger in screw threaded engagement with said head; a puller block made in sections; spacing members between said sections; clamping bolts extending through said sections and said spacing members; and means adjustably connecting said spacing members with the head; substantially as described.

3. A device of the character described including a head; a screw threaded plunger in screw threaded engagement with said head; a puller block made in sections; bolts for moving said sections toward each other; and means connecting said head and puller block, said means having holes through which said bolts extend and spaced apart at opposite sides of said screw threaded plunger; substantially as described.

4. A device of the character described including a head; a screw threaded plunger in screw threaded engagement with said head; a puller block having members provided with screw threaded cavities; and members in screw threaded engagement with said cavities and secured to said head; substantially as described.

5. A device of the character described including a head; a screw threaded plunger in screw threaded engagement with said head;

a puller block made in sections; spacing members between said sections and having screw threaded cavities and members in screw threaded engagement with said cavities and adjustably secured to said head; and clamping bolts extending through said sections and said spacing members; substantially as described.

In testimony whereof I have signed my name to this specification in the presence of two subscribing witnesses.

GEORGE W. SCHILLING.

Witnesses:
  CHAS. E. POTTS,
  ANNA RENTON.